United States Patent
Yoon et al.

(10) Patent No.: US 8,244,742 B2
(45) Date of Patent: Aug. 14, 2012

(54) METHOD, APPARATUS, AND SYSTEM FOR DATA TRANSMISSION BASED ON DLNA NETWORK

(75) Inventors: Won Shik Yoon, Suwon-si (KR); Yun Je Oh, Suwon-si (JP); Joon Oo Kim, Suwon-si (KR); Won Sang Kwon, Seoul (KR); Chul Seung Kim, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 369 days.

(21) Appl. No.: 12/370,689

(22) Filed: Feb. 13, 2009

(65) Prior Publication Data

US 2009/0222422 A1 Sep. 3, 2009

(30) Foreign Application Priority Data

Feb. 13, 2008 (KR) .................. 10-2008-0013006

(51) Int. Cl.
*G06F 17/30* (2006.01)
(52) U.S. Cl. .................. 707/756; 707/809; 709/231
(58) Field of Classification Search .................. None
See application file for complete search history.

(56) References Cited

U.S. PATENT DOCUMENTS

| | | | |
|---|---|---|---|
| 7,519,681 B2 * | 4/2009 | Edwards et al. | 709/217 |
| 7,937,469 B2 * | 5/2011 | Hamada et al. | 709/225 |
| 7,954,133 B2 * | 5/2011 | Stavenow et al. | 725/141 |
| 2007/0076251 A1 * | 4/2007 | Yasuda | 358/1.15 |
| 2007/0250872 A1 * | 10/2007 | Dua | 725/81 |
| 2007/0288966 A1 * | 12/2007 | Javid et al. | 725/46 |
| 2008/0043938 A1 * | 2/2008 | Yasuda | 379/88.08 |
| 2009/0049074 A1 * | 2/2009 | Dara-Abrams et al. | 707/102 |
| 2009/0106414 A1 * | 4/2009 | Stavenow et al. | 709/224 |
| 2009/0205006 A1 * | 8/2009 | Lopez-Estrada | 725/114 |
| 2011/0182205 A1 * | 7/2011 | Gerdes et al. | 370/254 |
| 2011/0196920 A1 * | 8/2011 | Hamada et al. | 709/203 |

* cited by examiner

*Primary Examiner* — Debbie Le
(74) *Attorney, Agent, or Firm* — Cha & Reiter, LLC (57) ABSTRACT

The present invention relates to a method, apparatus, and system for data transmission based on a DLNA (Digital Living Network Alliance) network that classifies contents files which are stored in a DMS according to a support of the DLNA network to make a contents list. Support is provided to convert a file attribute of a selected file into a file attribute which can be applied to the DLNA network to generate, in case a user selects a non-supported file which is not applied to the DLNA network. The invention outputs the selected file to a display unit, captures the outputted image to convert into a file which can be applied to the DLNA network.

18 Claims, 4 Drawing Sheets

METHOD, APPARATUS, AND SYSTEM FOR DATA TRANSMISSION BASED ON DLNA NETWORK

CLAIM OF PRIORITY

This application claims priority from an application entitled "METHOD, APPARATUS, AND SYSTEM FOR DATA TRANSMISSION BASED ON DLNA NETWORK" filed in the Korean Intellectual Property Office on Feb. 13, 2008 and assigned Serial No. 10-2008-0013006, the contents of which are incorporated herein by reference in its entirety.

BACKGROUND OF THE INVENTION

1. Field of the Invention

The present invention relates to a method, apparatus, and system for data transmission based on a DLNA (Digital Living Network Alliance) network. More particularly, the present invention relates to a method, apparatus, and system for data transmission based on a DLNA network which is capable of supporting the playback of various files based on the DLNA network.

2. Description of the Related Art

Recently, the exchange of the AV (Audio/video) contents such as, for example, a music or an image via an IP network continues to expand. For example, it is becoming more common to watch a television program or hear music via the Internet. The proliferation of exchanging the AV contents through a network has also spread to the home. Therefore, in the home, various AV machines are connected to configure a home network which enables to easily enjoy the AV contents. In order to realize such configuration, various automated mechanisms are required. In this case, it is not sufficient that the machines are just connected to a LAN interface or have a wireless LAN function.

Instead, it is required that the presence of the other party should be recognized through a network for a number of reasons, and there should be a search as to whether a desired content is present or not, and whether such desired contents can be exchanged. Various middleware (UPnP, HaVi, Jini, VESA, DLNA or the like) are used so as to recognize the presence of the other party through the network and to search for contents to exchange desired contents.

The DLNA (Digital Living Network Alliance), which is one of the middleware is focused on the sharing of all contents provided from instruments such as a TV, a VCR, a digital camera, an audio system or the like. The sharing of contents firstly requires the inter-compatibility of the instruments. Particularly, a network that connects a PC Internet network (a PC, a printer or the like), a mobile network (a PDA, a mobile phone, a notebook or the like), an electronic appliances network (a TV, an audio, a DVD player or the like) to the home needs to satisfy the cooperation between key industries, the standardization of the operating frame work, and the operating in the product which observes it.

Particularly, the DLNA supports in the position of consumer to obtain, transmit, and manage many digital media contents (for example, a photograph, music and a video or the like) from a private apparatus, such as a mobile device or a PC (Personal Computer). That is, the DLNA makes it possible to conveniently enjoy a media contents regardless of the location and the apparatus in home. Thus, the DLNA system can be a wired and wireless network system which, based on UPnP, includes a DMS (Digital Media Server), a DMP (Digital Media Player), a DMC (Digital Media Controller), and a DMR (Digital Media Renderer).

The DMS, DMP, and DMC include a M-DMS (Mobile-Digital Media Server), a M-DMP (Mobile-Digital Media Player), and a M-DMC (Mobile-Digital Media Controller) which are portable. The M-DMS, the M-DMP, the M-DMC can be directly connected to the DLNA system or can be connected to the DLNA system through an AP (Access Point). In addition, an M-NCF (Mobile-Network Connection Function) exists in the AP as an intermediate node for connecting the M-DMS to the M-DMP. A home network can be configured by the DLNA system through using a wired network (IEEE 802.3) or a wireless network (IEEE 802.11). The DMS, the DMP and the DMR on the home network can be interconnected through the wire (IEEE 802.3) or the wireless network (IEEE 802.11). The digital apparatus on the home network can transmit data such as an image, a voice through the IEEE 1394.

Particularly, the interconnection standard of the home network apparatus called "DLNA Guide-lines for the Standardization of the DLNA System" classifies the apparatus part of the DLNA into the DMS (Digital Media Server), the DMP (Digital Media Player), the DMC (Digital Media Controller) or the DMR (Digital Media Renderer), determining the connecting condition between the DMS and the DMP, the DMC or the DMR. In the meantime, the kind of a file that the DMS can process is restricted to a kind of multimedia file that the above-described DLNA guide-line supports. Accordingly, although the DMR has a capability of outputting various files, it can only replay a file that the DLNA guide-line restricts, so that the advantage is decreased.

SUMMARY OF THE INVENTION

The present invention has been made to provide a method, apparatus, and system for data transmission based on a DLNA network, for replaying various files by transfiguring the DMS function, regardless of the supporting of the DLNA guide-lines, for a contents file while not generating the compatibility problem with existing DMR instruments.

A method for data communications based on a DLNA network according to an exemplary embodiment of the present invention includes searching stored contents files by a digital media server according to a request of a digital media controller; extracting a non-supported file which the DLNA network does not support among the contents files; assigning a name of virtual file which can be checked in the DLNA network for the extracted non-supported file; and generating a contents list including a support file which the virtual file and the DLNA network support.

An apparatus for data communications based on a DLNA network according to an exemplary embodiment of the present invention includes a contents storage unit which stores contents files; a contents management unit which classifies contents files stored in the contents storage unit according to a support of DLNA network; and a contents directory service unit which generates a contents list by making use of a list of the classified contents files.

A system for data communications based on a DLNA network according to an exemplary embodiment of the present invention includes a digital media server which stores a contents file to provide according to a request; a digital media controller which requests a contents file for regeneration among the contents file; and a digital media renderer which regenerates requested by the digital media controller, wherein the digital media server generates a virtual file corresponding to a non-support file, and generates a contents list which includes the generated virtual file and a support file which a DLNA network supports, in case of including the non-support file which the DLNA network does not support among the stored contents file.

According to a method, apparatus, and system for data transmission based on a DLNA network of the present invention, there is the replaying of various files by transmitting and replaying through transfiguring regardless of the supporting of the DLNA guide-line.

BRIEF DESCRIPTION OF THE DRAWINGS

The exemplary objects, features and advantages of the present invention will become more apparent to a person of ordinary skill in the art from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention with such well-known functions and structures.

Hereinafter, the exemplary configuration included in a DLNA network will be illustrated based on a DMS, a DMC and a DMR. The configuration included in such DLNA network may include a DMP in which the functions of the DMC and the DMR are integrated, as well as the above-described configuration. Moreover, a PC, a mobile phone, or a PDA to which the invention can be practically applied corresponds to an apparatus that integrates the DMS and the DMC among the above-described configurations. Further, it may correspond to an apparatus in which the DMS and the DMP function are integrated. Here, the above described PC can include not only a desktop PC but also a notebook, and a tablet PC or the like.

The DMR can include a digital television, and a projector or the like, and the digital television and the projector can include a communications module which transmits and receives a data in the DLNA network. The communications module can include the above-described apparatuses, that is, all modules to which the PC, the mobile phone, or the PDA, and the digital television and the projector or the like can be connected by wire or wireless.

In the meantime, hereinafter, a source replayed by the DMR will be called as "file", "contents" or "contents file". A file which is not applied to the DLNA network, that is, a file which the DLNA guide-line does not support will be called as "non-supported file". Accordingly, a file which the DLNA guide-line supports will be called a support file.

In the present invention, a data transmission apparatus defines, for example, a file which supports indicating the non-supported file in the DLNA network as a virtual file, and assigns a virtual file name so as to output the virtual file to a display unit. In the invention, the virtual file can be understood, for example, to comprise a file which does not store the substantial content of the file, but supports to distinguish the non-supported file in the DLNA network. Therefore, the designating of the virtual file by selecting the virtual name will perform the same operation as the designating of the non-supported file.

Figure 1:
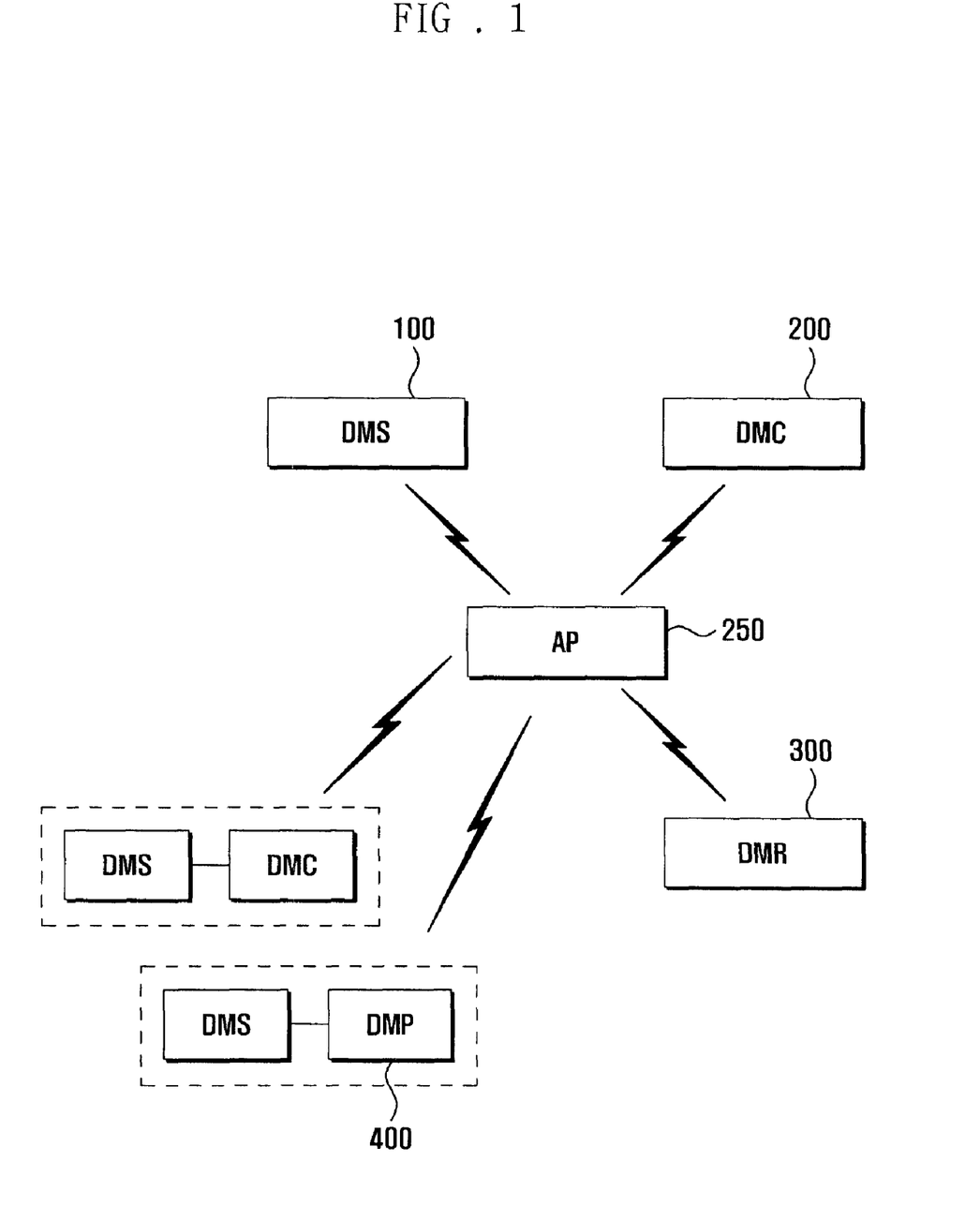
FIG. 1 is a drawing illustrating a configuration of a data transmission system based on a DLNA network according to an exemplary embodiment of the present invention.

FIG. 1 is a drawing illustrating a configuration of a data transmission system based on a DLNA network according to an exemplary embodiment of the present invention.

Referring now to FIG. 1, the data transmission system of the present invention includes a Digital Media Server (DMS) 100 and a DMP (Digital Media Player) 400 or a DMS 100 and a Digital Media Controller (DMC) 200, an AP (Access Point) 250 and a DMR (Digital Media Renderer) 300. The DMP 400 has a configuration which includes the function of the DMC (Digital Media Controller) and the DMR.

The DMP 400 may comprise, for example, an instrument such as a PC including the DMS 100 function, a mobile phone and a PDA. The PC including the above-described DMS 100 function, or the mobile phone and the PDA generates a virtual file name and can support in order that a user can see the generated virtual file name, with respect to a file that the DLNA guide-line does not support among lists of various stored contents. The user designates a corresponding contents which will be transmitted to the DMR 300 through the DMP 400. In this case, when the designated corresponding contents is not a file which the DLNA guide-line does not support, the above-described PC or the mobile phone and the PDA or the like can perform a task of converting into a file which the DLNA guide-line supports.

In other words, in a case where the selected contents file is a file which the DLNA guide-line does not support, the PC of the present invention (or the mobile phone and PDA, e.g. "device") capture a screen information outputted from the apparatus itself; thereafter, the device encodes and generates a conversion file according to a method which the DLNA guide-line supports, for example, a MPEG method. Then, the apparatuses can transmit the generated conversion file to the DMR 300 with a streaming type transmission. The DMS 100 plays a role of storing a digital media contents or providing it to the DMR 300 while having the capability of approaching to the contents in UPnP (Universal Plug and Play) AV area.

The DMC 200 provides a search function for searching the digital media contents item within the DMS 100 including a control point CP which is an UI (User-interface) application, and supports that the DLNA network user displays or distribute the contents. In the meantime, the DMS 100 is related with the DMR 300, for example, the DMS 100, which is a broadcasting receiver for receiving a digital broadcasting, receives and stores a broadcast signal. Thereafter, the DMS provides the selected contents to the DMR 300 when a request of the DMC 200 (which controls the DMR 300) occurs.

Particularly in this example, the DMS 100 of the present invention generates a virtual file name corresponding to a corresponding file so that the DMC 200 can search files which are provided by the control of the DMC 200 or the DMP 400, not only files which are defined by the DLNA guide-line but also various non-supported files that are stored in the DMS 100 and which the DLNA guide-line does not support, and is provided to the DMC 200 or the DMP 400. In case the DMC 200 or the DMP 400 selects a virtual file which the DLNA guide-line does not support, the DMS 100 performs a task which converts a corresponding file into a file which the DLNA guide-line supports and generates a conversion file.

The configuration of the DMS 100 will now be described herein below in detail with reference to FIG. 2 with the apparatuses described above.

Still referring to FIG. 1, the DMC 200 is positioned between the DMS 100 and the DMR 300 and performs the control of regenerating the DMR 300 while receiving the contents list which the DMS 100 generates. Here, the contents list which the DMC 200 receives can include, for example, a virtual file directory which the DLNA guide-line does not support. The DMC 200 controls specific contents which are selected through a control signal transmission between the DMS 100 and the DMR 300, so that the DMS 100 might transmit the contents to the DMR 300.

The AP 250 relays a control signal which the DMP 400 transmits to the DMR 300 or the DMS 100, and relays a streaming signal which the DMS 100 transmits to the DMP 400. Moreover, in case a user tries to connect to the DMS 100 and to select and generate the contents list by using the DMC 200, the AP 250 can relay a control signal delivered from the DMC 200 to the DMS 100, and can relay a streaming signal transmitted from the DMS 100 to the DMR 300 via the DMC 200.

The DMR 300 replays the contents which the DMP 400 or the DMC 200 selected. In case of the DMP 400, the DMR can be included. At this time, the DMR 300 can receive a conversion file which the DMS 100 converted with a streaming type, and output. In the meantime, the DMR 300 can output a various contents list which the DMS 100 has according to the DMC 200 control. The DMR 300 may comprise, for example, a TV, and a projector or the like. The data transmission system of the invention having such an exemplary configuration supports the file which the DLNA network does not support in order to convert into a file which the DLNA network supports and outputs. In other words, in case the DMS 100 stores the file which the DLNA network does not support, the data transmission system of the invention generates a virtual file name for the stored DLNA guide-line non-supported file, and supports a user to identify the generated virtual file name.

Then, in case a user wants to regenerate the DLNA guide-line non-support file supported with the virtual file name among the contents list, the DMS 100 converts a corresponding non-support file into a file which the DLNA guide-line supports to generate a conversion file. Here, the invention transmits the generated conversion file to the DMR 300 with a streaming type to output, such that even a file which the DLNA guide-line does not support can be regenerated.

Hereinafter, an apparatus corresponding to the DMS 100 and DMC 200 or the DMP 400 among the configuration of the data transmission system based on a DLNA network of the invention will be illustrated with a portable terminal as an example. However, the DMP 400, the DMS 100, and the DMC 200 of the present invention are not restricted to the above-described specific device, but it is obvious that it can be corresponded to various electronic devices applied to the DLNA network.

Figure 2:
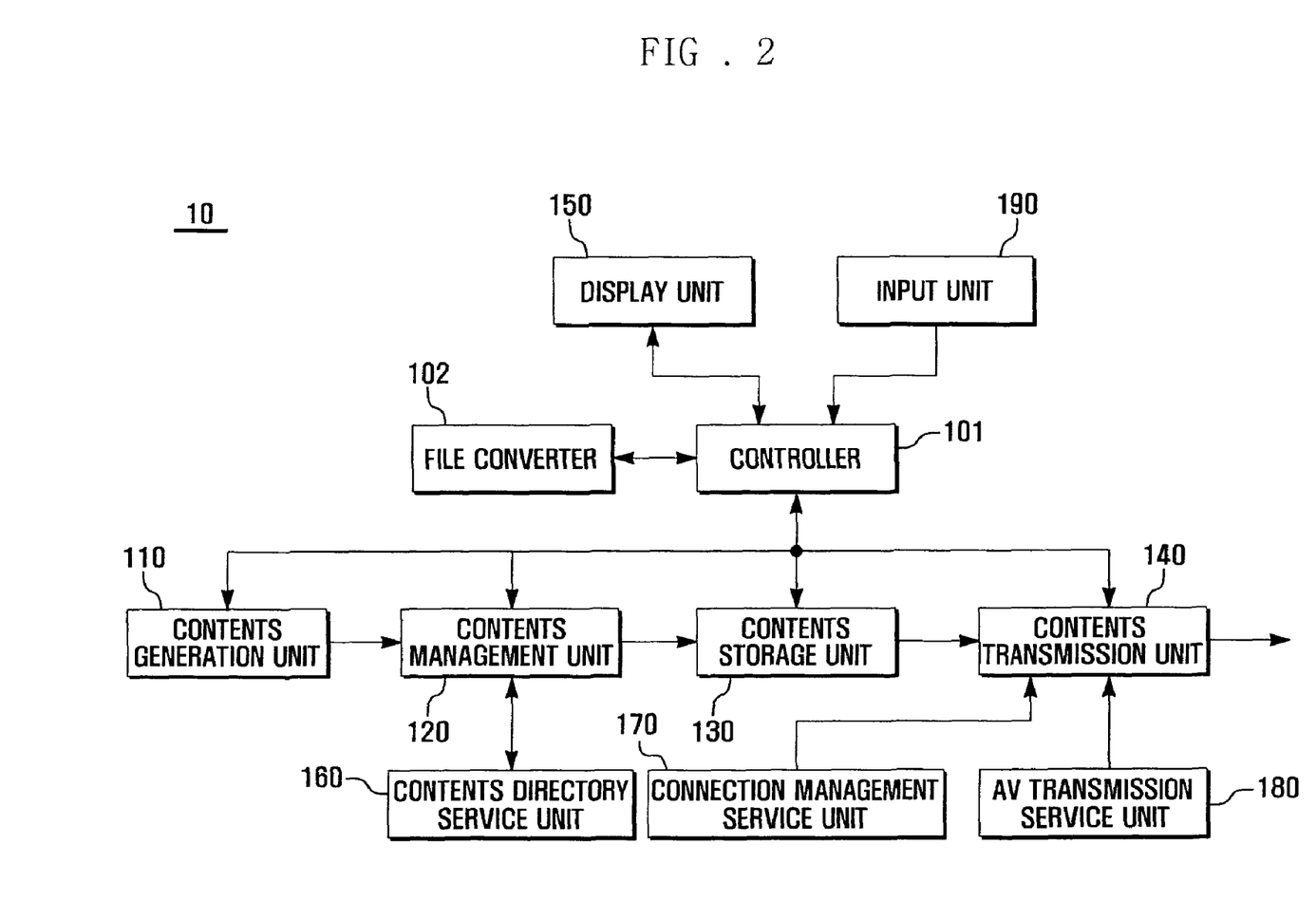
FIG. 2 is a drawing illustrating a configuration of a portable terminal according to another exemplary embodiment of the present invention.

FIG. 2 is a schematic diagram of an exemplary configuration of the portable terminal 10 corresponding to the DMP 400, the DMS 100 and the DMC 200 of a data transmission system based on a DLNA network of the present invention.

Referring now to FIG. 2, the exemplary configuration of portable terminal 10 includes a contents generation unit 110, a contents management unit 120, a contents storage unit 130, a contents transmission unit 140, a connection management service unit 170, an AV transmission service unit 180, a contents directory service unit 160, an input unit 190, a display unit 150, a controller 101 and a file converter 102. The portable terminal 10 of the invention having such an exemplary configuration generates a virtual file of the non-support files which the DLNA guide-line does not support with respect to various files which are stored in the contents storage unit 130, and supports the generated virtual file to output to the display unit 150 so that a user can select.

When the user selects the non-supported file outputted to the virtual file, the portable terminal 10 converts it into a file which the DLNA guide-line supports to generate a conversion file, while outputting the generated conversion file to the display unit 150 and transmitting it to the DMR 300.

Hereinafter, the exemplary contents of portable terminal 10 of the present invention will be illustrated in detail. The contents generation unit 110 can directly generate contents or can generate new contents by processing the contents received from the other DMS through a network. The contents that are generated by the contents generation unit 110 is stored in the contents storage unit 130 through the contents management unit 120.

Still referring to FIG. 2, the contents management unit 120 comprises a module which controls the contents which the contents generation unit 110 generates and delivers. The contents management unit 120 supports the contents directory service unit 160 to generate a contents list. That is, the contents management unit 120 provides a list of contents stored in the contents storage unit 130 according to the request of the contents directory service unit 160. At this time, the contents management unit 120 can store the contents list which the contents directory service unit 160 generated, into the contents storage unit 130. In case the non-supported files which the DLNA guide-line does not support are stored in the contents storage unit 130, the contents management unit 120 generates the virtual file name of a corresponding non-support files.

Thereafter, the contents management unit 120 can renew the contents list by including the above described virtual files in the contents list. The generated contents list can be stored in the contents storage unit 130 and can be delivered to the contents directory service unit 160. The contents storage unit 130 stores the contents which the contents generation unit 110 delivers while storing the contents list which the contents management unit 120 generates. Here, the contents stored in the contents storage unit 130 can include not only the files which the DLNA guide-line supports but also the files which the DLNA guide-line does not support, for example, can include a PPT data, and a PDF data or the like.

Accordingly, the contents list stored in the contents storage unit 130 can include not only support file names which the above-described DLNA guide-line supports but also virtual file names corresponding to the non-supported file. The various contents and the contents list which the contents storage unit 130 stored are transmitted to the display unit 150 and DMR 300 through the contents transmission unit 140 respectively. The contents transmission unit 140 transmits the contents stored in the contents storage unit 130 to the DMR 300 through a network, that is, through the AP. In other words, the contents transmission unit 140 of the present invention controls to output the contents list including the virtual file name corresponding to the non-support file to the display unit 150 while transmitting a specific contents which the input unit 190 selects to the DMR 300.

The contents directory service unit 160 provides one service based on an Universal Plug and Play (UPnP) AV structure, while providing the contents by delivering the contents list stored in the contents storage unit 130 to an external device. That is, the contents directory service unit 160 can deliver the contents list which is generated based on the contents, which the contents management unit 120 manages, to the display unit 150 and the contents transmission unit 140. The connection management service unit 170 provides a service based on an UPnP (Universal Plug and Play) AV structure, while managing the connection with the apparatuses which approaches the portable terminal 10. That is, the connection management service unit 170 manages the connection of the DMR, which is connected to a DLNA network for connecting to the portable terminal 10 through a network, the connection of the DMC (Digital Media Controller), which is able to control the portable terminal 10, and the connection of the other portable terminal for forming a communications channel with the portable terminal 10.

The AV transmission service unit 180 provides a service based on an UPnP AV structure, transmits a routine for the connection with the DMR 300, and manages the contents and the contents list. That is, the AV transmission service unit 180 supports the transmission of a control signal for supporting a contents total control service including the contents list transmission, and the regeneration, the pause, and the "sleep" of the contents. The display unit 150 displays a screen according to a various functional support of the portable terminal 10. That is, the display unit 150 supports a stand-by screen, a call screen, a message preparation screen, and a menu screen. Particularly, the display unit 150 can process and output an image included in a file, in the playback of the file stored in the contents storage unit 130. In the meantime, the display unit 150 may be comprised of, for example, a liquid crystal display (hereinafter, LCD). In case where the LCD is made with a touch screen type, the display unit 150 can be included in an input means.

Still referring to FIG. 2, the input unit 190 includes a plurality of input keys and function keys for receiving number or character information and setting various functions. Function keys can include, for example, a direction key, a side key and a shortcut key which are set up to perform a specific function. Moreover, the input unit 190 generates a key signal relating with a user setting and a function control of the portable terminal 10, and delivers to the controller 101. Particularly, the input unit 190 of the invention can generate an input signal for designating and selecting a specific list of the contents list outputted to the display unit 150, an input signal for regenerating a file corresponding to the selected list, and an input signal for controlling to transmit a file corresponding to the selected list to the DMR 300, and can deliver to the controller 101.

The controller 101 can control the performance of each configuration and the transmission of signals which are transceived between the configurations in order to control the overall operation of the portable terminal 10. Particularly, the controller 101 of the invention performs the output of the contents list of the display unit 150, the process of selecting one of the outputted list and transmitting to the DMR 300, the control of activating the file converter 102, so as to convert a file in case the selected list is a non-support file which the DLNA guide-line does not support, the control of transmitting the conversion file to the DMR 300, and the control of transmitting an input signal inputted from the input unit 190 or the display unit 150 performing an input function to the DMR 300.

The file converter 102 converts the selected non-supported file into a file which the DLNA guide-line supports, in case a user selects the non-supported file which the DLNA guide-line does not support among the files included in the contents list by using the input unit 190, after the contents management unit 120 outputs the contents list of various files which are stored in the contents storage unit 130 to the display unit 150 according to an input signal of the input unit 190 and the control of the controller 101.

Figure 3:
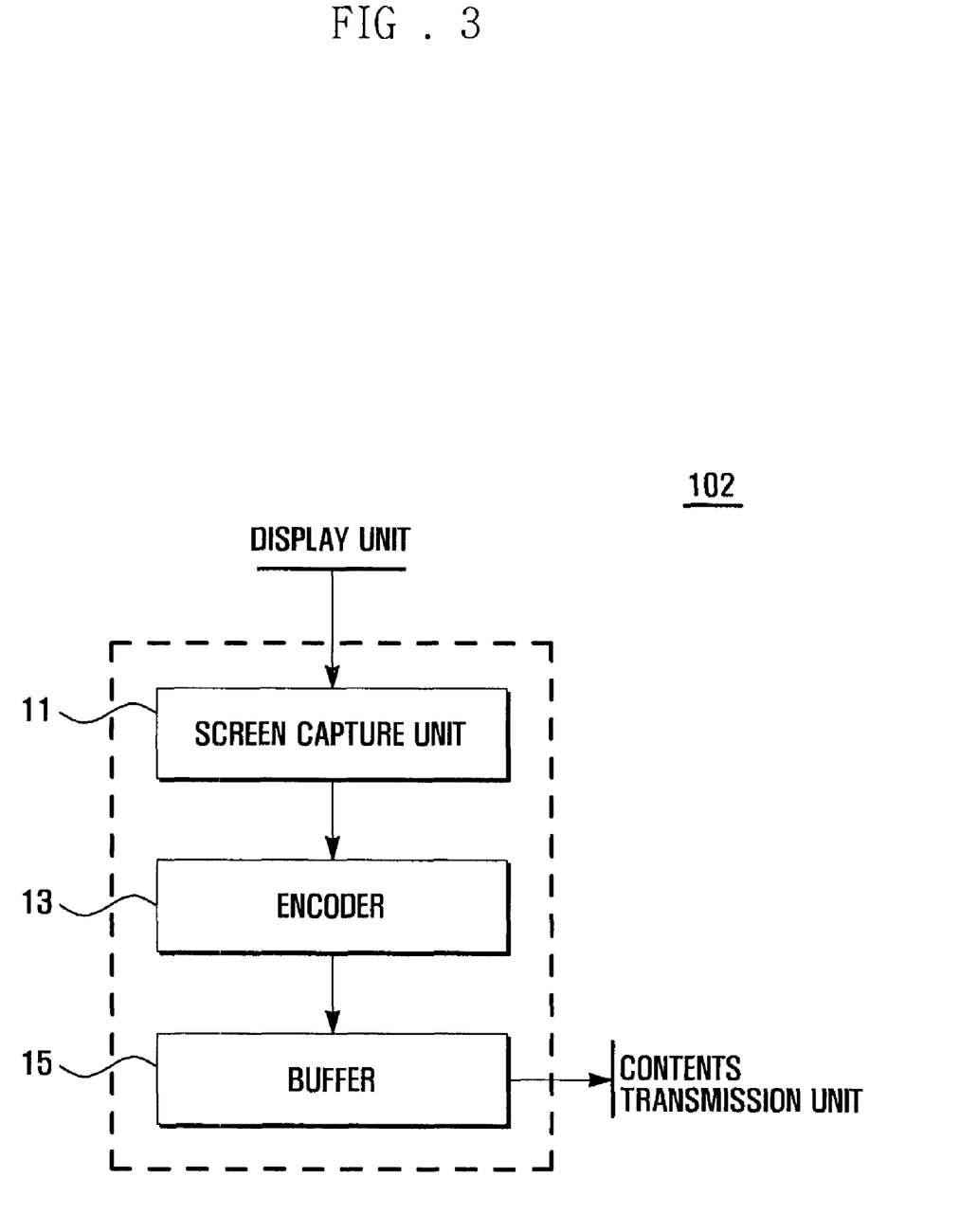
FIG. 3 is a drawing illustrating an example of a file converter according to an exemplary embodiment of the present invention.

As shown in FIG. 3, the file converter 102 includes a screen capture unit 11, an encoder 13 and a buffer 15.

The screen capture unit 11 captures the screen outputted to the display unit 150 and generates a capture image, and delivers the generated capture image to the encoder 13. Here, the screen capture unit 11 can capture, not only the image outputted to the display unit 150 but also the other images currently outputted to the display unit 150. In other words, additional images corresponding to a signal inputted by the input unit 190 or the display unit 150 having an input function, into the contents storage unit 130.

For example, the display unit 150 has a touch screen function, outputting a PDF document. In case the additional image including a line or a character is entered on the display unit 150 according to the touch screen function, the screen capture unit 11 can, for example, capture the state where the line or the character is entered with the image of the document outputted to the display unit 150 on a real time basis and generate a capture image.

The encoder 13 converts the capture image which the screen capture unit 11 delivered into a file which the DLNA guide-line supports, for example, a MPEG file or a JPEG file. The encoder 13 delivers the transformed conversion file to the buffer 15. The buffer 15 buffers the conversion file which the encoder 13 encodes. The buffer 15 delivers the buffered conversion file to the contents transmission unit 140 according to the control of the controller 101.

As described above, the exemplary portable terminal 10 of the present invention assigns a virtual file name of the non-support files which the DLNA guide-line does not support and prepares a contents list, outputting a selected non-support file to the display unit 150, in case a user selects the virtual file name corresponding to the non-support file among the prepared contents list. The portable terminal 10 captures the outputted image and converts it into a file which the DLNA guide-line supports, transmitting the conversion file to the DMR 300 by making use of the DLNA network.

Here, the portable terminal 10 can generate a conversion file by capturing not only a simple image outputted to the display unit 150 but an image corresponding to a signal from the input unit on a real time basis, and can transmit the generated conversion file to the DMR 300 with a streaming type. In the above description, the data transmission system of the present invention, the elements comprising the system and the apparatus corresponding to them were illustrated. Hereinafter, a data communications method based on the data transmission system will be illustrated.

Figure 4:
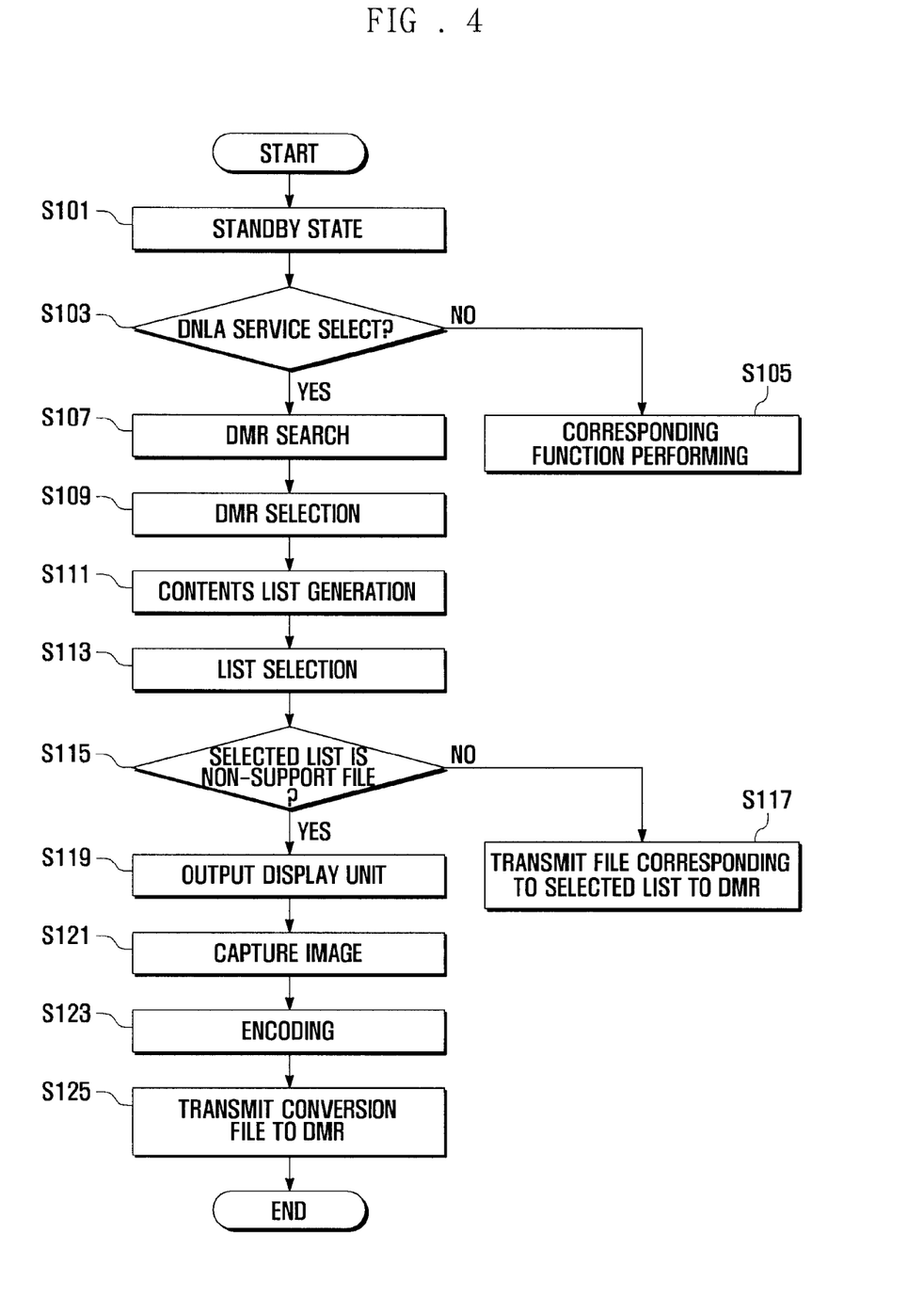
FIG. 4 is a flowchart illustrating a data transmission method based on a DLNA network according to an exemplary embodiment of the present invention.

FIG. 4 is a flowchart illustrating exemplary operation of a data communications method of a portable terminal based on a DLNA network according to an exemplary embodiment of the present invention.

Hereinafter, the portable terminal can mean an apparatus which the DMS and the DMC are combined or an apparatus which the DMS and the DMP are combined among the data transmission system based on the above-described DLNA network.

Referring now to FIG. 4, in the data communications method of the invention, firstly, the portable terminal maintains a stand-by screen state (S101), and checks whether or not the DLNA service is selected (S103). Herein, the portable terminal can provide an option for supporting a DLNA service as a menu type.

Therefore, in the case where a portable terminal user wants to make use of the DLNA service, the user selects, for example, the DLNA service after activating the menu. In case where the portable terminal user does not make use of the DLNA service at step S103, the operation of the portable terminal branches off (S105) and can support performing a corresponding function of the portable terminal, such as, for example, the call function, the file playback function, or the broadcasting receiving function or the like.

In the meantime, if the DLNA service is activated at step S105, the portable terminal searches the DMR (Digital Media Renderer) that is available in its surroundings (S107). It is preferable that the portable terminal supports a user to select an apparatus to use by outputting the DMR supporting the DLNA service after searching the DMR. Then, the portable terminal user checks the list of the DMR apparatuses through the display unit, and selects the DMR to use (S109). In case the DMR is selected, the portable terminal can generate the list of the contents (S111) so that the user might select one of various contents which are stored in the contents storage unit, and can output the generated contents list to the display unit.

At this point of the operation, the portable terminal generates virtual files corresponding to non-support files so that a user can select contents which cannot be applied to the DLNA network among various contents which are stored in the contents storage unit, that is, can select non-supported files. Thereafter, the portable terminal generates the contents list by integrating the contents applied to the virtual files and the DLNA network. Consequently, the contents list includes the list of various files which are stored in the contents storage unit regardless of the DLNA network, that is, whether the DLNA guide-line supports or not.

The user selects the contents list for regenerating among the contents list outputted to the display unit (S113). At this time, the portable terminal checks whether the contents list which the user selected (S115), that is, a selection list, is a non-supported file which the DLNA guide-line does not support or not. In case the selection list which the user selected at step S115 is a file which can be applied to the DLNA network, it branches off (S117), so that the file corresponding to the selection list is searched in the contents storage unit and the searched corresponding file is transmitted to the DMR. Then, the DMR can output the file which the portable terminal transmits. Here, the DMR is an apparatus including an output device which can output a data transmitted from the portable terminal. It may comprise, for example, devices including but in no way limited to a TV, particularly, a digital TV, a projector, and a PC monitor or the like.

In the meantime, in case the selection list is a non-supported file at step S115, the portable terminal outputs a file corresponding to the selection list to the display unit. Here, it is assumed that the files stored in the portable terminal can be outputted to the display unit which is included in the terminal regardless of the support of the DLNA guide-line. In other words, the files stored in the contents storage unit are a type which can be outputted to the display unit of the portable terminal. The portable terminal can capture the image of the state of outputting to the display unit (S119). That is, the portable terminal captures the image outputted to the display unit and generates a capture image.

For example, the portable terminal examines a frame buffer allocated to the display unit, and copies the image stored in the frame buffer such that the outputted image can be captured.

After the image is captured, the portable terminal encodes the capture image into a type which can be applied to the DLNA network (S121) and generates a conversion file. For example, the portable terminal can encode the capture image as a MPEG type. The conversion file can be transmitted to the DMR (S125).

In the meantime, at step S119, the portable terminal captures an image, which is outputted to the display unit, which corresponding to an input signal from the input unit or the display unit having an input function, while capturing image.

At this time, after capturing the image outputted to the display unit on a real time basis, the portable terminal consecutively generates the capture image, converting it into a file which the DLNA guide-line supports. Then, the portable terminal can output the image outputted to the display unit to the DMR on a real time basis, by transmitting the conversion file to the DMR with a streaming type. For example, when the portable terminal outputs a specific document to the display unit and performs a task of making a mark or a line on the outputted document, the DMR can output the generating process to the display unit of the above-described portable terminal on a real time basis.

As described in the above, the method, the apparatus and the system of the data communications based on a DLNA network according to an exemplary embodiment of the present invention can support the file which the DLNA network does not support to be able to output to the DMR based on a system which can be applied to the DLNA network. Moreover, the invention transmits a file, which is applicable to the DLNA network to the DMR, by processing in the DMS on a real time basis under the control of the DMC, thereby, being able to provide the function that a user can add an arbitrary transfiguration for a file in the regeneration as well as the function of the existing simple playback of file.

In the above, a portable terminal having a configuration in which a DMS and a DMC are combined or a configuration in which a DMS and a DMP are combined was illustrated, however, but the invention is not restricted to this. That is, the invention is able to convert a contents file which is not supported in the DLNA network into a file type capable of supporting a contents file which can be supported in the DLNA network, while providing a function that a user can arbitrarily convert a contents, when various contents which are stored in the DMS are regenerated.

As described in the above, the method, the apparatus and the system of the data communications work according to an exemplary embodiment of the invention can provide a function of processing a file which the DLNA network does not support, that is, a function of providing a contents list for a non-support file which the DLNA network does not support and a function of changing the attribute of a file in order that the non-supported file can be outputted in the DMR, while maintaining the function of the contents playback sharing between various apparatuses which the DLNA network supports. Moreover, the invention can process the transfiguration of various files by a user on a real time basis and output.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for data communications based on a Digital Living Network Alliance (DLNA network), the method comprising:

searching stored contents files by a digital media server (DMS) in response to a request;

extracting a non-supported file which the DLNA network does not support from among the contents files;

assigning a virtual file name to the extracted file not supported by the DLNA network; the virtual file name distinguishing the file as being a file not supported by the DLNA network from a file supported by the DLNA network;

generating a contents list including the name of the virtual file and names of files that the DLNA network supports;

providing the contents list to a Digital Media Controller (DMC);

selecting one of the generated contents list, by the DMC;

determining whether the selected contents file is a non-support file, by the DMS;

generating, by the DMS, a conversion file by converting a file attribute when the selected file is a non-supported; and transmitting the conversion file to a digital media renderer (DMR) by the DMS.

2. The method of claim 1, wherein the step of determining whether the selected contents file is a non-supported file comprises:

determining whether the selected contents file has a virtual file name.

3. The method of claim 1, wherein generating a conversion file comprises:

outputting an image associated with the non-supported file;

generating a capture image by capturing the outputted image; and encoding the capture image into a file type which is supported by the DLNA network.

4. The method of claim 3, wherein generating a capture image comprises:

outputting an additional image corresponding to a signal input; and capturing the additional image and the outputted image.

5. The method of claim 3, wherein generating a capture image comprises capturing the image on a real time basis.

6. The method of claim 1, wherein transmitting the conversion file comprises transmitting the conversion file with streaming.

7. An apparatus for data communications based on a Digital Living Network Alliance (DLNA) network, the apparatus comprising:

a contents storage unit for storing contents files;

a contents management unit for classifying contents files stored in the contents storage unit according to a support function of the DLNA network;

a contents directory service unit for generating a contents list by making use of a list of the classified contents files, wherein the contents management unit generates a virtual file for a file not-supported by the DLNA network and assigns a virtual file name to the generated virtual file, the virtual file name distinguishing the file as being a file not supported by the DLNA network; and a file converter for converting a file attribute associated with a file not supported by the DLNA network to a file supported by the DLNA network.

8. The apparatus of claim 7, wherein the contents directory service unit generates a contents list including named of files supported by the DLNA network supports and the virtual file name.

9. The apparatus of claim 7, further comprising a display unit outputting the contents list;

an input unit for generating an input signal for selecting one of the contents files from the outputted contents list; and a contents transmission unit for transmitting the selected contents file to a digital media renderer (DMR).

10. The apparatus of claim 9, wherein the file converter outputs the selected contents file to the display unit, captures the outputted image, and converts the file attribute into a file attribute which the DLNA network supports.

11. The apparatus of claim 10, wherein the file converter captures an additional image and the outputted image, the additional image corresponding to a signal input from the input unit that is output to the display unit.

12. The apparatus of claim 10, wherein the file converter captures the outputted image which is outputted to the display unit on a real time basis and generates a capture image.

13. A system for data communications based on a Digital Living Network Alliance (DLNA) network, the system comprising:

a digital media server (DMS) which stores a contents file for subsequent selection in accordance with a request;

a digital media controller (DMC) which requests the contents file for regeneration among a plurality of contents files; and a digital media renderer (DMR) which regenerates requests by the DMC, wherein the DMS generates a virtual file corresponding to a file not supported by the DLNA network, and generates a contents list which includes the generated virtual file, identified by a virtual file name distinguishing the file as being a file not supported by the DLNA network, and a file which a DLNA network supports, and comprises:

a file converter for generating a conversion file by converting a file attribute of a selected contents file, in response to the DMC selecting a non-supported file from the generated contents list.

14. The system of claim 13, wherein the DMS further comprises:

a display unit for displaying the selected contents file; and a contents transmission unit for transmitting the conversion file to the DMR.

15. The system of claim 14, wherein the file converter outputs a contents file corresponding to the selected contents list to the display unit, captures the outputted image, and converts the file attribute into a file attribute which the DLNA network supports.

16. The system of claim 15, wherein the file converter captures an additional image and the outputted image, the additional image corresponding to a signal which is input from the DMC and output to the display unit.

17. The system of claim 15, wherein the file converter generates a conversion file after generating a capture image by capturing an image outputted to the display unit on a real time basis.

18. The system of claim 17, wherein the contents transmission unit transmits the conversion file to the DMR with a streaming type.

* * * * *

UNITED STATES PATENT AND TRADEMARK OFFICE
CERTIFICATE OF CORRECTION

PATENT NO. : 8,244,742 B2  
APPLICATION NO. : 12/370689  
DATED : August 14, 2012  
INVENTOR(S) : Won Shik Yoon et al.

Page 1 of 1

It is certified that error appears in the above-identified patent and that said Letters Patent is hereby corrected as shown below:

In the Claims:

Column 11, Claim 8, Line 60 should read as follows:
--...list including names of files...--

Signed and Sealed this  
Twenty-eighth Day of May, 2013

Teresa Stanek Rea  
*Acting Director of the United States Patent and Trademark Office*